(12) United States Patent
Bernasconi et al.

(10) Patent No.: US 7,945,165 B2
(45) Date of Patent: May 17, 2011

(54) OPTICAL SIGNAL SYNCHRONIZER

(75) Inventors: Pietro Arturo Bernasconi, Aberdeen, NJ (US); Jane D. LeGrange, Princeton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 741 days.

(21) Appl. No.: 11/941,201

(22) Filed: Nov. 16, 2007

(65) Prior Publication Data

US 2009/0129780 A1   May 21, 2009

(51) Int. Cl.
*H04B 10/00* (2006.01)
*H04J 14/00* (2006.01)
(52) U.S. Cl. ............. 398/102; 398/53; 398/161; 398/85
(58) Field of Classification Search .................. 398/102, 398/161, 85, 53, 43, 79
See application file for complete search history.

(56) References Cited

U.S. PATENT DOCUMENTS

| | | | |
|---|---|---|---|
| 6,259,847 B1 | 7/2001 | Lenz et al. | |
| 6,289,151 B1 | 9/2001 | Kazarinov et al. | |
| 6,373,608 B1 | 4/2002 | Desurvire et al. | |
| 6,731,829 B2 | 5/2004 | Ionov | |
| 6,801,721 B1 | 10/2004 | Madsen | |
| 6,956,991 B2 | 10/2005 | Madsen | |
| 7,016,615 B1 | 3/2006 | Lenz et al. | |
| 7,212,695 B2 | 5/2007 | Kasper et al. | |
| 7,627,253 B1 | 12/2009 | Ng | |
| 2002/0097464 A1* | 7/2002 | Devaux et al. | 359/124 |
| 2009/0003830 A1 | 1/2009 | Fishman et al. | |

OTHER PUBLICATIONS

J. Gripp, et al., "Optical Switch Fabrics for Ultra-High Capacity IP Routers," Journal of Lightwave Technology, 2003, vol. 21, No. 11, pp. 2839-2850.
J. LeGrange, et al., "Demonstration of an Integrated, Tunable High Resolution True Time Delay Line," Lasers and Electro-Optics Society, 2004 (LEOS 2004), 17th annual meeting of IEEE, pp. 790-791.
C. K. Madsen, et at., "Optical All-Pass Filters for Phase Response Design with Applications for Dispersion Compensation," IEEE Photonics Technology Letters, vol. 10, No. 7, Jul. 1998, pp. 994-996.
C.K. Madsen, et al., "Compact Integrated Tunable Chromatic Dispersion Compensator with a 4000 pshm Tuning Range," Optical Fiber Communication and Exhibit, 2001 (OFC 2001), (3 pages).
G. Lenz, et al., "Optical Delay Lines Based on Optical Filters," IEEE Journal of Quatum Electronics, vol. 37, No. 4, Apr. 2001, pp. 525-532.
Mahmoud S. Rasras, et al., "Integrated Resonance-Enhance Variable Optical Delay Lines," IEEE Photonics Technology Letters, vol. 17, No. 4, Apr. 2005, pp. 834-836.

* cited by examiner

*Primary Examiner* — M. R Sedighian
(74) *Attorney, Agent, or Firm* — Mendelsohn, Drucker & Associates, P.C.

(57) ABSTRACT

One embodiment of the invention provides an optical signal synchronizer having a plurality of optical channel synchronizers. Each optical channel synchronizer receives a respective input wavelength division multiplexing (WDM) signal and processes it to produce a corresponding output WDM signal, in which optical data packets corresponding to different carrier wavelengths are synchronized to each other regardless of the presence or absence of such synchronization in the input WDM signal. The optical signal synchronizer further has an optical multiplex synchronizer that receives the output WDM signals from the optical channel synchronizers and synchronizes them to each other and to an external reference clock without demultiplexing any of them into individual WDM components.

18 Claims, 9 Drawing Sheets

100

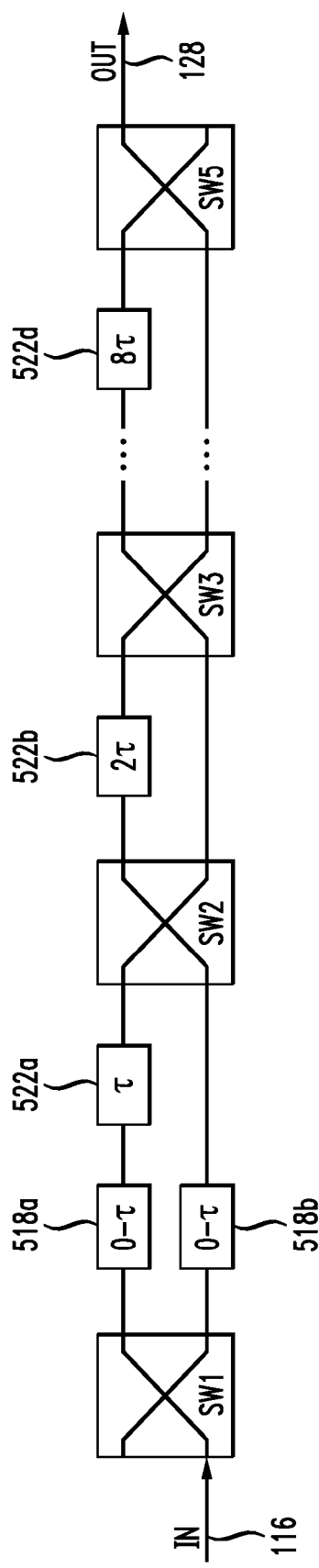

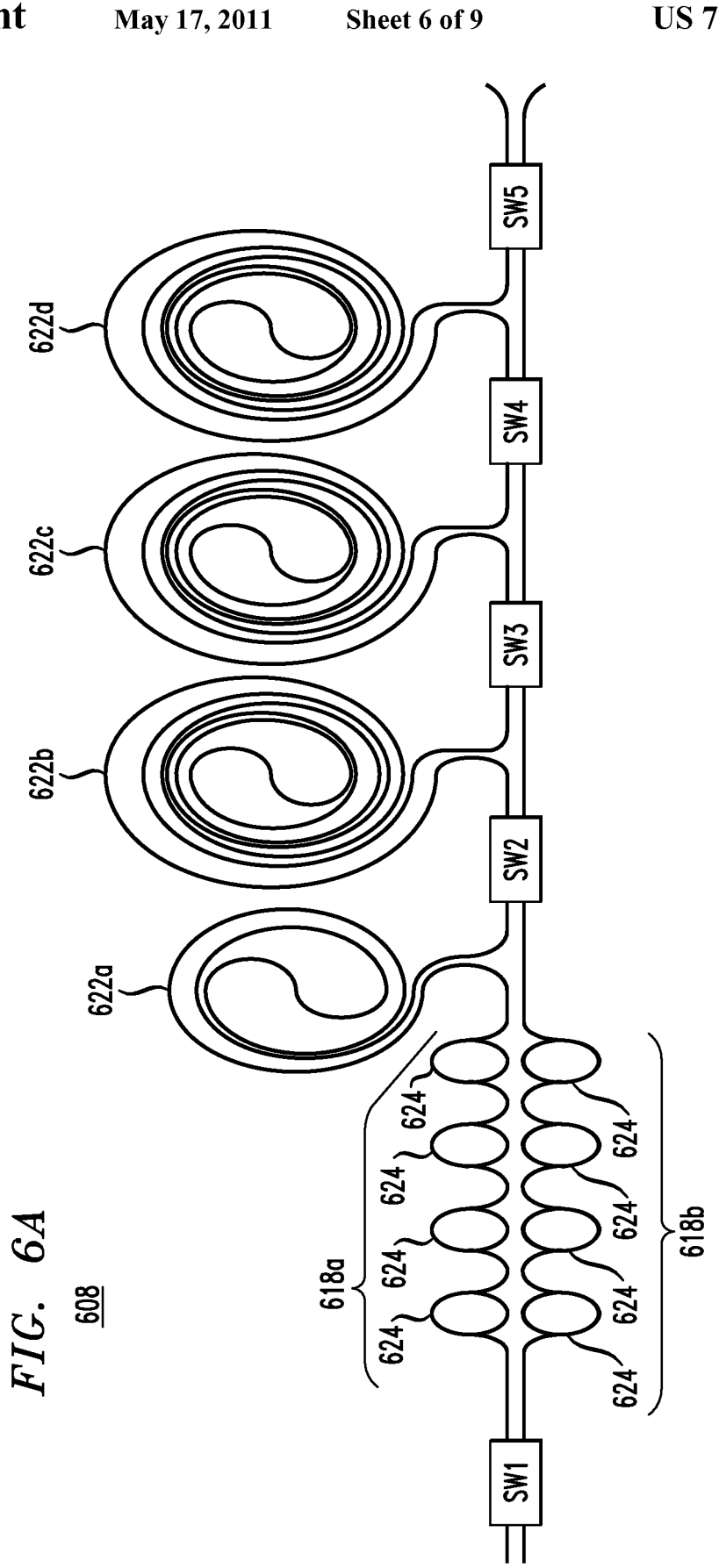

OPTICAL SIGNAL SYNCHRONIZER

This invention was made with Government support under Contract No. FA8750-04-C-0013 awarded by Defense Advanced Research Projects Agency (DARPA) under the DOD-N (Data in the Optical Domain Networking) program. The Government has certain rights in this invention.

CROSS-REFERENCE TO RELATED APPLICATIONS

This application is related to U.S. patent application Ser. No. 11/941,191, filed on the same date as the present application, and now published as U.S. patent application Publication No. 2009/0129779 entitled "Multiplex Delay Unit," which is incorporated herein by reference in its entirety.

BACKGROUND OF THE INVENTION

1. Field of the Invention

The present invention relates to optical communication equipment and, more specifically, to optical packet routing systems.

2. Description of the Related Art

An optical packet router is one of the key enabling components of an optical communication network. One of the most efficient optical packet routers is based on a synchronous optical switch fabric, which enables substantial enhancement of bandwidth and reduction in network latency. Proper operation of a synchronous optical switch fabric is achieved when all incoming data packets are appropriately synchronized to a reference clock. However, if the synchronization is not sufficiently accurate and/or stable, then the resulting skew and/or jitter in incoming data packets may cause transmission errors or other deleterious effects on the network traffic. For example, one deleterious effect of poor alignment is that it might force the use of a relatively large guard time between packets, bits, cells, and/or envelopes, which appreciably reduces the throughput of the switch or router.

SUMMARY OF THE INVENTION

One embodiment of the invention provides an optical signal synchronizer having a plurality of optical channel synchronizers. Each optical channel synchronizer receives a respective input wavelength division multiplexing (WDM) signal and processes it to produce a corresponding output WDM signal, in which optical data packets corresponding to different carrier wavelengths are synchronized to each other regardless of the presence or absence of such synchronization in the input WDM signal. Each optical channel synchronizer has (i) a demultiplexer that demultiplexes the input WDM signal into a plurality of individual WDM components and directs each component along a respective tunable delay path and (ii) a multiplexer that receives the individual WDM components from the tunable delay paths and multiplexes them back to form the output WDM signal.

The optical signal synchronizer further has an optical multiplex synchronizer that receives the output WDM signals from the optical channel synchronizers and synchronizes them to each other and to an external reference clock without demultiplexing any of them into individual WDM components. The optical multiplex synchronizer has a plurality of optical all-pass filters (OAPFs), each adapted to apply continuously tunable group delay to the WDM signal received from a corresponding optical channel synchronizer. Each OAPF has a free spectral range (FSR) that matches spectral separation between carrier wavelengths of the WDM signal. The optical multiplex synchronizer further has a delay controller that controls the group delays of the OAPFs.

According to one embodiment, an optical signal synchronizer comprises a plurality of optical channel synchronizers, each adapted to process a respective input wavelength division multiplexing (WDM) signal to produce a respective output WDM signal, in which optical data packets corresponding to different carrier wavelengths are synchronized to each other regardless of the presence or absence of such synchronization in the input WDM signal. The optical signal synchronizer further comprises a delay controller adapted to control relative optical delays introduced by different optical channel synchronizers to synchronize the respective output WDM signals to each other regardless of the presence or absence of such synchronization in the input WDM signals.

According to another embodiment, an optical signal synchronizer comprises: (1) a first demultiplexer (DEMUX) adapted to demultiplex an input WDM signal into a plurality of individual WDM components and direct said components along one or more tunable delay paths; and (2) a first multiplexer (MUX) adapted to receive the individual WDM components from the tunable delay paths and multiplex said received WDM components to produce an output WDM signal, in which optical data packets corresponding to different carrier wavelengths are synchronized to each other regardless of the presence or absence of such synchronization in the input WDM signal.

According to yet another embodiment, a method of synchronizing optical signals comprises the steps of: (A) demultiplexing an input WDM signal into a plurality of individual WDM components; (B) directing said components along one or more tunable delay paths; (C) multiplexing individual WDM components received from the tunable delay paths to produce an output WDM signal; and (D) selecting optical delays applied by the one or more tunable delay paths to the individual WDM components so that, in said output WDM signal, optical data packets corresponding to different carrier wavelengths are synchronized to each other regardless of the presence or absence of such synchronization in the input WDM signal.

BRIEF DESCRIPTION OF THE DRAWINGS

Other aspects, features, and benefits of the present invention will become more fully apparent from the following detailed description, the appended claims, and the accompanying drawings in which:

FIG. 5 shows a block diagram of an optical tunable delay circuit that can be used in the multiplex synchronizer of FIG. 4 according to one embodiment of the invention;

FIGS. 6A-B show top views of an optical tunable delay circuit that can be used in the multiplex synchronizer of FIG. 4 according to another embodiment of the invention;

DETAILED DESCRIPTION

Figure 1:
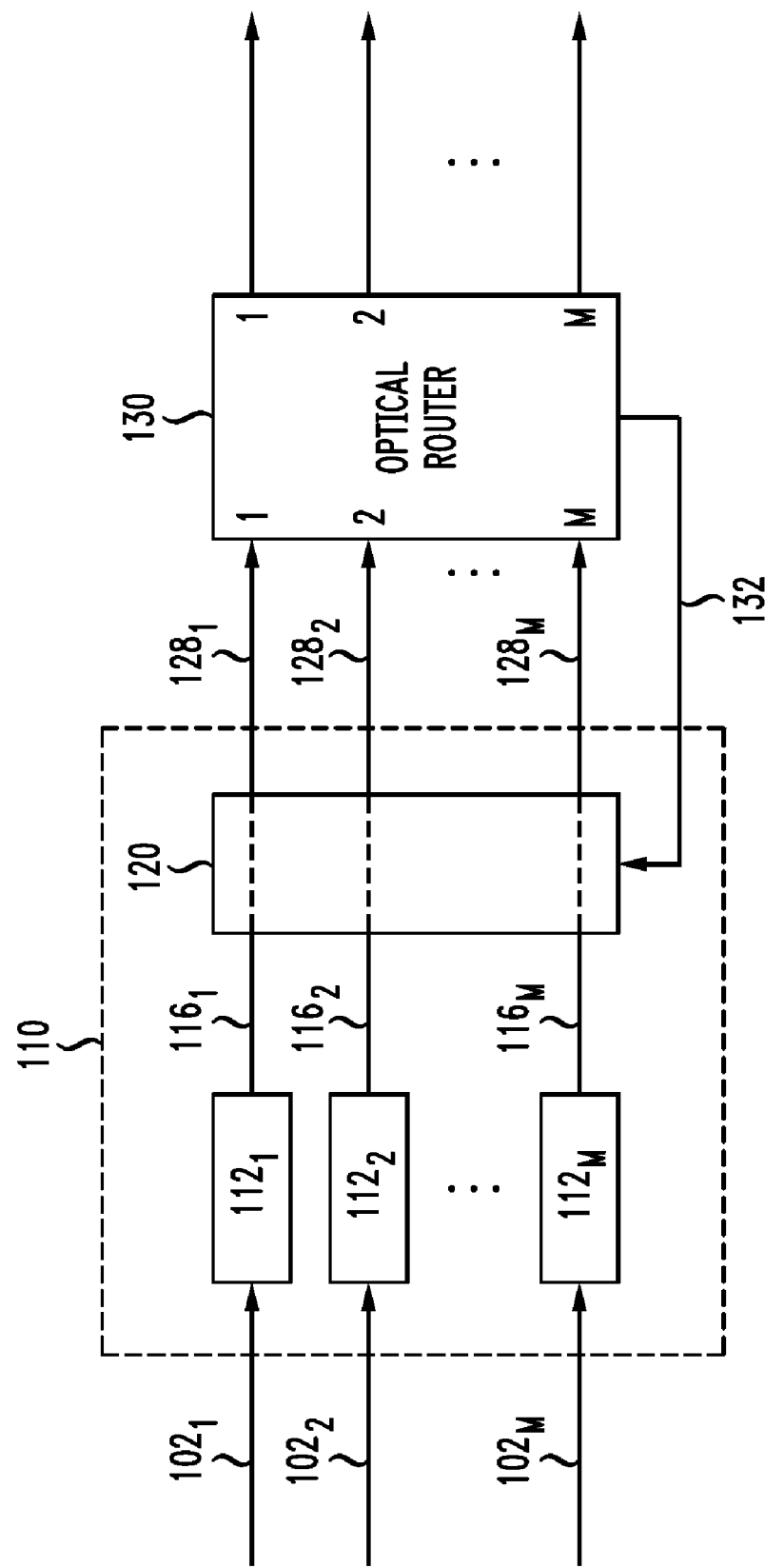
FIG. 1 shows a block diagram of an optical communication system according to one embodiment of the invention.

FIG. 1 shows a block diagram of an optical communication system 100 according to one embodiment of the invention. System 100 receives a plurality of wavelength division multiplexing (WDM) signals $102_1$-$102_M$ from external network components (not explicitly shown). Each of signals $102_1$-$102_M$ has N carrier wavelengths ($\lambda_1$-$\lambda_N$), each modulated to carry data packets.

An optical communication system similar to system 100 is usually designed so that each of its optical elements has appropriate spectral characteristics that enable proper handling of the WDM signals that populate the system. The number of and spectral separation between the WDM components of a WDM signal are usually set based on a convention or standard. For example, the most common frequency (wavelength) grid is that used for dense WDM (DWDM) and defined by a standard promulgated by the International Telecommunication Union (see ITU-T G.694.1). This grid is defined relative to 193.1 THz and extends from about 191.7 THz to about 196.1 THz, with 100-GHzi spacing. While defined in frequency, the grid is also often expressed in terms of wavelength, in which case its wavelength range is from about 1528 nm to about 1564 nm, with about 0.8-nm channel spacing. For practical purposes the grid is often extended to cover the range from about 186 THz to about 201 THz and subdivided to provide 50-GHz and 25-GHz spaced grids.

At the transmitter (not explicitly shown in FIG. 1), different WDM components are generated, e.g., using lasers and optical modulators, and applied to a multiplexer, which joins them together to form a corresponding WDM signal. En route to the receiver, the WDM signal may pass through one or more optical add-drop multiplexers, optical filters, and optical routers (e.g., similar to router 130), wherein the original WDM signal might be altered in terms of its wavelength composition and/or data content. At the receiver (not explicitly shown in FIG. 1), the WDM signal is applied to a de-multiplexer, which splits it into individual WDM components for detection. The hardware of the optical signal generators, multiplexers, filters, routers, and de-multiplexers employed in the system ultimately defines the spectral characteristics of the WDM signals transported therein.

For a given WDM signal 102, data packets corresponding to different wavelengths may or may not be synchronized with one another. As used herein, the term "synchronized" refers to temporal alignment of data packets at respective selected locations. For example, two data packets of different wavelengths in a single WDM signal 102 are considered to be synchronized at an input port of system 100 if their leading edges arrive at that input port substantially simultaneously, i.e., the difference between the times of arrival is smaller than a designated relatively small tolerance. Two data packets of the same wavelength or different wavelengths in two different WDM signals 102 are considered to be synchronized at two different respective input ports of system 100 if their leading edges arrive at those respective input ports substantially simultaneously. Furthermore, two data packets of the same or different wavelengths in the same or different WDM signals 102 are considered to be synchronized if their leading edges arrive at respective same or different locations with a predetermined relative time delay, i.e., the difference between the times of arrival deviates from the predetermined time delay by no more than a designated tolerance.

System 100 has a synchronous optical router 130 having M input ports and M output ports and capable of directing a data packet received at any of its input ports to any of its output ports. For example, data packets of wavelengths $\lambda_i$ and $\lambda_j$ applied at time to input port k can be routed to any selected output ports l and m, respectively. Router 130 incorporates an appropriate controller that prevents packet collisions at the output ports. More specifically, said controller configures router 130 so that, in any given time slot, an output port does not receive from the input ports more than one packet of each wavelength. More details on synchronous optical routers similar to router 130 can be found, e.g., in an article by J. Gripp, et al., entitled "Optical Switch Fabrics for Ultra-High Capacity IP Routers," published in Journal of Lightwave Technology, 2003, v. 21, no. 11, pp. 2839-2850, the teachings of which are incorporated herein by reference.

Router 130 operates properly if WDM signals $128_1$-$128_M$ applied to input ports 1-M, respectively, are appropriately synchronized to one another and to a reference clock that controls the synchronous switching function of the router. To have signals $128_1$-$128_M$ synchronized, system 100 incorporates an optical signal synchronizer 110. Synchronizer 110 receives WDM signals $102_1$-$102_M$, which may or may not be synchronized, and processes them to produce synchronized WDM signals $128_1$-$128_M$, respectively. The following synchronizations might be lacking in WDM signals $102_1$-$102_M$: (1) between two or more different WDM components of a single WDM signal 102 and (2) between two or more different WDM signals 102. In contrast, WDM signals $128_1$-$128_M$ are appropriately synchronized to one another and to a reference clock signal 132 supplied by router 130. More specifically, different WDM components of each WDM signal 128 are synchronized to each other and to reference clock signal 132. Also, different WDM signals 128 are synchronized to each other and to reference clock signal 132. As used herein, the term "WDM component" means a component of the WDM signal that can carry data, e.g., a data packet. Spectrally, a WDM component comprises a carrier wavelength and one or more modulation sidebands corresponding to that carrier wavelength. Different WDM components of the same WDM signal have different carrier wavelengths and generally carry independent sets of data.

Synchronizer 110 has a plurality of channel synchronizers $112_1$-$112_M$. Each channel synchronizer 112 is dedicated to processing a respective WDM signal 102 and operates to synchronize packets of different wavelengths (channels) in that signal to each other. A WDM signal $116_i$ produced by channel synchronizer $112_i$ carries the same data packets as WDM signal $102_i$. However, those data packets are synchronized to each other even if such synchronization was not present in the original WDM signal.

WDM signals $116_1$-$116_M$ produced by channel synchronizers $112_1$-$112_M$, respectively, are applied to a multiplex synchronizer 120, which operates to synchronize different WDM signals to each other and to reference clock signal 132. The resulting synchronized WDM signals $128_1$-$128_M$ are suitable for synchronous switching in router 130. Synchronizer 120 is termed a "multiplex synchronizer" because it synchronizes a plurality of multiplexes, i.e., WDM signals $116_1$-$116_M$. In one embodiment, multiplex synchronizer 120 is a waveguide circuit designed to synchronize WDM signals $116_1$-$116_M$ without demultiplexing any of them into individual WDM components.

Figure 2:
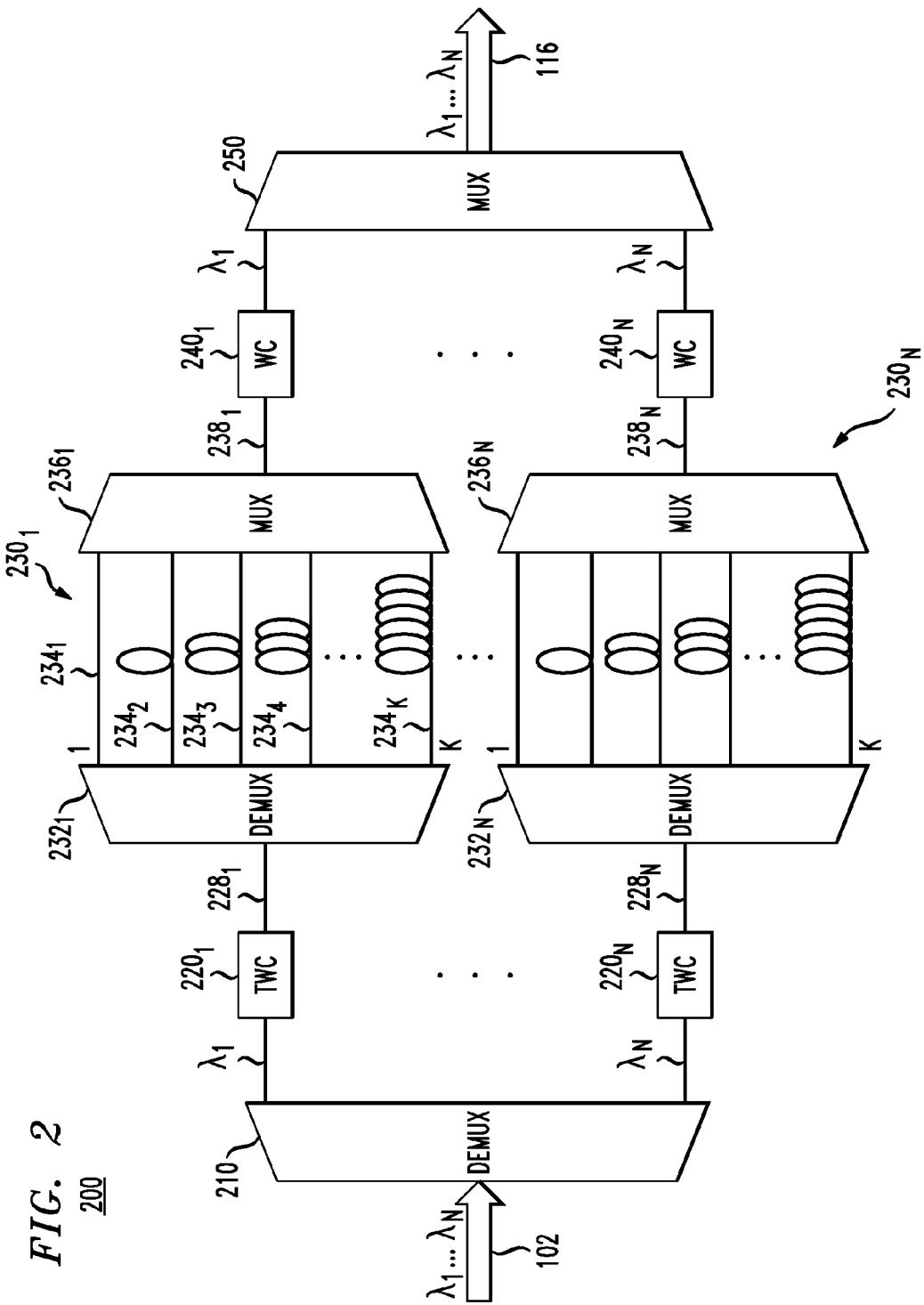
FIG. 2 shows a block diagram of a channel synchronizer that can be used in the system of FIG. 1 according to one embodiment of the invention.

FIG. 2 shows a block diagram of a channel synchronizer 200 that can be used as each instance of channel synchronizer 112 in FIG. 1 according to one embodiment of the invention. Channel synchronizer 200 has a demultiplexer (DEMUX) 210 that separates WDM signal 102 into its individual WDM components and applies each WDM component to a respective tunable wavelength converter (TWC) 220. Each TWC 220 is designed to convert its input wavelength into a selected one of K output wavelengths, which K output wavelengths may or may not include some or all of wavelengths $\lambda_1$-$\lambda_N$. The output of each TWC 220 feeds a respective delay unit 230 having a respective array of delay lines $234_1$-$234_K$ coupled between a DEMUX 232 and a multiplexer (MUX) 236. Delay lines $234_1$-$234_K$ have different optical lengths, e.g., incrementally increasing from a relatively short length of delay line $234_1$ to a relatively long length of delay line $234_K$. In one embodiment, signal-propagation times for any two adjacent delay lines 234 differ by the same time increment $\Delta t$, which time increment determines the time resolution of delay unit 230.

DEMUX 232 has K optical channels that accommodate the K possible output wavelengths of TWC 220. More specifically, DEMUX 232 is designed to direct each of those K wavelengths to a different one of its K output ports. MUX 236 is substantially analogous to DEMUX 232, except that optical signals traverse the former from the multi-port side to the single-port side, whereas the latter is traversed from the single-port side to the multi-port side. An optical signal 228 applied by TWC 220 to the input port of DEMUX 232 appears, as a corresponding optical signal 238, at the output port of MUX 236.

The wavelength conversion imposed by TWC 220 determines through which one of delay lines $234_1$-$234_K$ signal 228 propagates in the course of traversing delay unit 230. By appropriately selecting the output wavelengths for different TWCs 220, one can therefore delay signals $228_1$-$228_N$ by respective appropriate delay times to produce at the output ports of MUXes $236_1$-$236_N$ synchronized optical signals $238_1$-$238_N$. Note that signals $238_1$-$238_N$ are synchronized to within about one half of the time resolution ($\Delta t$) of delay unit 230. In one embodiment, delay unit 230 has a $\Delta t$ value of about 1/10 of the optical-packet length. If the temporal alignment of one or more components of WDM signal 102 changes over time, then the wavelength conversion selection for TWCs $220_1$-$220_N$ can be adjusted accordingly to maintain synchronization of signals $238_1$-$238_N$.

Each optical signal 238 is applied to a respective "fixed" wavelength converter (WC) 240, where it undergoes a wavelength conversion process that is reverse to that imposed by the preceding TWC 220. More specifically, WC 240, converts the wavelength of signal $238_1$ back into $\lambda_1$. WC $240_p$ (not explicitly shown in FIG. 2, 1<p<N) converts the wavelength of signal $238_p$ back into $\lambda_p$. Finally, WC $240_N$ converts the wavelength of signal $238_N$ back into $\lambda_N$. WC 240 is termed "fixed" because it essentially converts any input wavelength into a prescribed ("fixed") wavelength. In one embodiment, TWC 220 and WC 240 can be implemented using different instances of the same physical wavelength-conversion device. To implement TWC 220, an instance of that device is configured, using appropriate control signals, to convert a predetermined input wavelength into a desired (tunable) output wavelength. Similarly, to implement WC 240, an instance of that device is configured, using appropriate control signals, to convert any (tunable) input wavelength into a predetermined output wavelength.

A MUX 250 multiplexes the optical signals produced by WCs $240_1$-$240_N$ into WDM signal 116. Note that the latter signal has the same wavelength and data packet composition as WDM signal 102. However, unlike the packets carried by the WDM components of WDM signal 102, the packets carried by the WDM components of WDM signal 116 are synchronized to each other.

Figure 3:
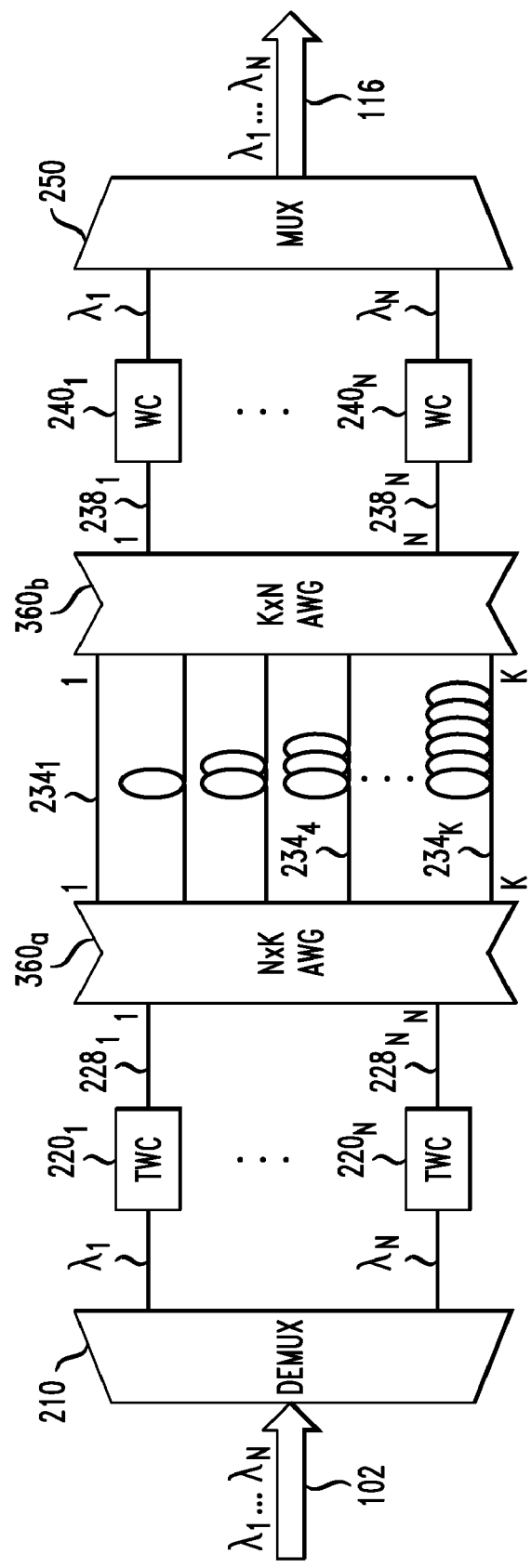
FIG. 3 shows a block diagram of a channel synchronizer that can be used in the system of FIG. 1 according to another embodiment of the invention.

FIG. 3 shows a block diagram of a channel synchronizer 300 that can be used as each instance of channel synchronizer 112 in FIG. 1 according to another embodiment of the invention. Channel synchronizers 200 and 300 are generally analogous to one another. However, instead of delay units $230_1$-$230_N$ in the former, the latter has two N×K arrayed waveguide gratings (AWGs) 360a-b with a single array of delay lines $234_1$-$234_K$ coupled between them. Each of AWGs 360a-b has (i) a first side having N ports and (ii) a second side having K ports. Similar to DEMUX 232 and MUX 236, each of AWGs 360a-b is designed to operate using the K possible output wavelengths of TWCs 220.

In one embodiment, AWG 360 is a cyclical AWG. More specifically, each of the N ports located at the first side of AWG 360 is optically coupled to each of the K ports located at the second side of the AWG using K wavelengths. Mathematically, optical coupling of any port located at the first side of AWG 360 to the K optical ports located at the second side of that AWG can be described by a K-dimensional vector (hereafter termed the "coupling vector") having, as its components, the K wavelengths arranged in an appropriate order. For an N×K cyclical AWG, if one of such coupling vectors is known, then the remaining N–1 coupling vectors can be obtained by cyclically shifting the components of the known coupling vector.

In channel synchronizer 300, the above-described cyclical properties of AWGs 360a-b result in the following transmission characteristics. Optical signal $228_i$ ($1 \leq i \leq N$) emerges as optical signal $238_i$ regardless of the particular wavelength produced by TWC $220_i$. No signal collisions occur in any of delay lines $234_1$-$234_K$ because signals having the same wavelength but applied to different input ports of AWG 360a always emerge at different output ports of that AWG. As a result, if any one of delay lines $234_1$-$234_K$ receives two or more optical signals at the same time, those optical signals have different respective wavelengths and do not collide with each other. The latter property advantageously enables sharing of the single array of delay lines $234_1$-$234_K$ in channel synchronizer 300 without collisions or need for additional arrays. One skilled in the art will appreciate that, in other embodiments, AWGs other than cyclical AWGs can similarly be used in channel synchronizer 300.

Similar to the wavelength conversion in channel synchronizer 200, the wavelength conversion imposed by each particular TWC 220 in channel synchronizer 300 determines through which one of delay lines $234_1$-$234_K$ the corresponding optical signal 228 propagates before it emerges as optical signal 238 at the back side of AWG 360b. By appropriately selecting the output wavelengths for different TWCs 220 in channel synchronizer 300, one can therefore synchronize optical signals $238_1$-$238_N$ to each other. If the temporal alignment of one or more WDM components of WDM signal 102 changes over time, then the wavelength conversion selection for TWCs $220_1$-$220_N$ in channel synchronizer 300 can be adjusted accordingly to maintain synchronization of signals $238_1$-$238_N$ and therefore that of the WDM components of WDM signal 116.

In an alternative embodiment, the cyclic nature of AWGs 360 can be used to achieve the same input-output connectivity through different cyclic permutations of the input wavelengths and/or cyclic permutation of the input-output ports. For example, in the embodiment described above, whatever signal enters port 1 of AWG 360a then emerges at port 1 of AWG 360b. In the alternative embodiment, the design of AWG 360b can be modified so that whatever signal enters port 1 of AWG 360a then comes out at port 2 of AWG 360b. Similarly, whatever signal enters port 2 of AWG 360a then comes out at port 3 of AWG 360b, and so on. Finally, whatever signal enters port N of AWG 360a then comes out at port 1 of AWG 360b. Other cyclic permutations are also possible.

Figure 4:
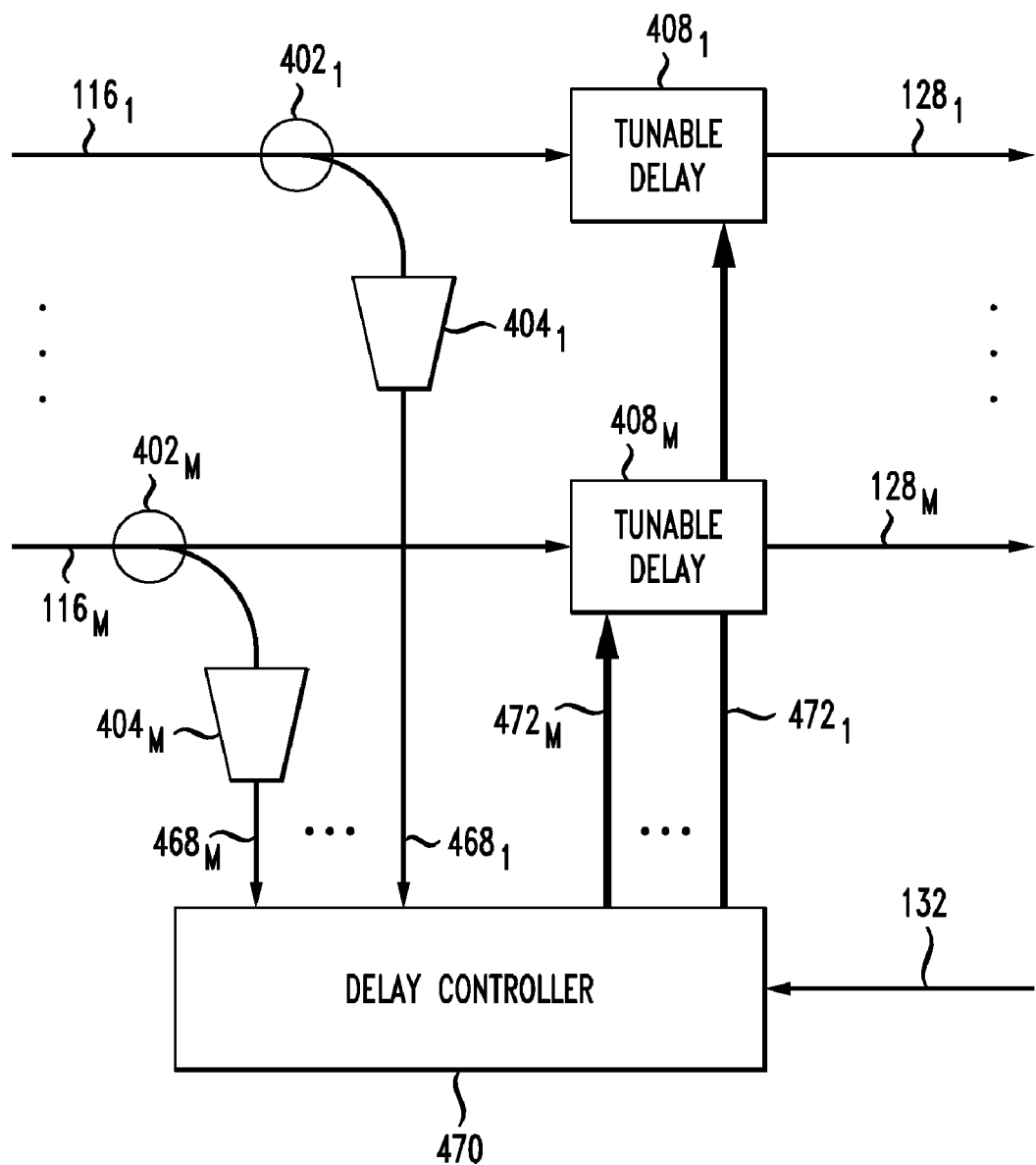
FIG. 4 shows a block diagram of a multiplex synchronizer that can be used in the system of FIG. 1 according to one embodiment of the invention.

FIG. 4 shows a block diagram of a multiplex synchronizer 400 that can be used as multiplex synchronizer 120 according to one embodiment of the invention. Multiplex synchronizer 400 has an array of optical tunable delays $408_1$-$408_M$, each receiving a respective one of WDM signals $116_1$-$116_M$. Tunable delay 408 is a continuously tunable optical delay circuit controlled by a control signal 472 generated by a delay controller 470. Delay controller 470 receives reference clock signal 132 (see FIG. 1) and M monitor signals $468_1$-$468_M$. Each monitor signal 468 is generated by (i) tapping the respective WDM signal 116 using an optical tap 402 and (ii) converting the output of the tap into an electrical signal using an optical-to-electrical converter (e.g., a photodiode) 404. Delay controller 470 processes monitor signals $468_1$-$468_M$ to determine temporal alignment of WDM signals $116_1$-$116_M$ with each other and with reference clock signal 132. Based on the processing results, delay controller 470 generates control signals $472_1$-$472_M$ that configure tunable delays $408_1$-$408_M$, respectively, to delay each of WDM signals $116_1$-$116_M$ by a respective appropriate amount so that the resulting delayed signals, i.e., WDM signals $128_1$-$128_M$, are synchronized to each other and to reference clock signal 132. Continuous monitoring of WDM signals $116_1$-$116_M$ via monitor signals $468_1$-$468_M$ enables delay controller 470 to appropriately adjust, if necessary, the settings of tunable delays $408_1$-$408_M$ to maintain said synchronization of WDM signals $128_1$-$128_M$. In an alternative embodiment, multiplex synchronizer 400 can tap WDM signals $128_1$-$128_M$ instead of or in addition to WDM signals $116_1$-$116_M$. The tap signals can similarly be converted into electrical signals and supplied to delay controller 470 for generating control signals $472_1$-$472_M$.

FIG. 5 shows a block diagram of an optical tunable delay circuit 508 that can be used as each instance of optical tunable delay 408 according to one embodiment of the invention. Circuit 508 has a plurality of optical delay elements 518 and 522 connected between five 2×2 switches SW1-SW5. Each of optical delay elements 518a-b is a continuously tunable delay element that can be configured to introduce any selected signal-propagation delay between 0 and τ. Optical delay elements 522a-d are fixed delay elements that introduce signal-propagation delays τ, 2τ, 4τ, and 8τ, respectively. In other words, optical delay elements 522a-d form a binary set of fixed delay elements.

By engaging or disengaging various delay elements, delay circuit 508 can access a continuous delay range between 0 and 16τ. More specifically, switch SW1 can direct the optical signal (e.g., WDM signal 116) applied to the input port of delay circuit 508 to a delay arm having serially connected delay elements 518a and 522a or to a delay arm having delay element 518b. Then, switch SW2 can direct the optical signal received from switch SW1 to a delay arm having delay element 522b or to a delay arm that bypasses that delay element. Switch SW3 can direct the optical signal received from switch SW2 to a delay arm having delay element 522c (not explicitly shown in FIG. 5) or to a delay arm that bypasses that delay element. Switch SW4 (not explicitly shown in FIG. 5) can direct the optical signal received from switch SW3 to a delay arm having delay element 522d or to a delay arm that bypasses that delay element. Finally, switch SW5 directs the optical signal received from switch SW4 to the output port of delay circuit 508, e.g., to produce WDM signal 128.

To produce a delay value between 0 and τ, switches SW1-SW5 of delay circuit 508 are configured to direct WDM signal 116 through delay element 518b and bypass all other delay elements. To produce a delay value between τ and 2τ, switches SW1-SW5 are configured to direct WDM signal 116 through delay elements 518a and 522a and bypass all other delay elements. To produce a delay value between 2τ and 3τ, switches SW1-SW5 are configured to direct WDM signal 116 through delay elements 518b and 522b and bypass all other delay elements, etc. A detailed description of the design and operation of optical tunable delay circuits that, similar to circuit 508, can provide a relatively large continuously tunable delay range can be found, e.g., in commonly owned U.S. Pat. Nos. 6,956,991 and 7,212,695, both of which are incorporated herein by reference.

Figure 6B:
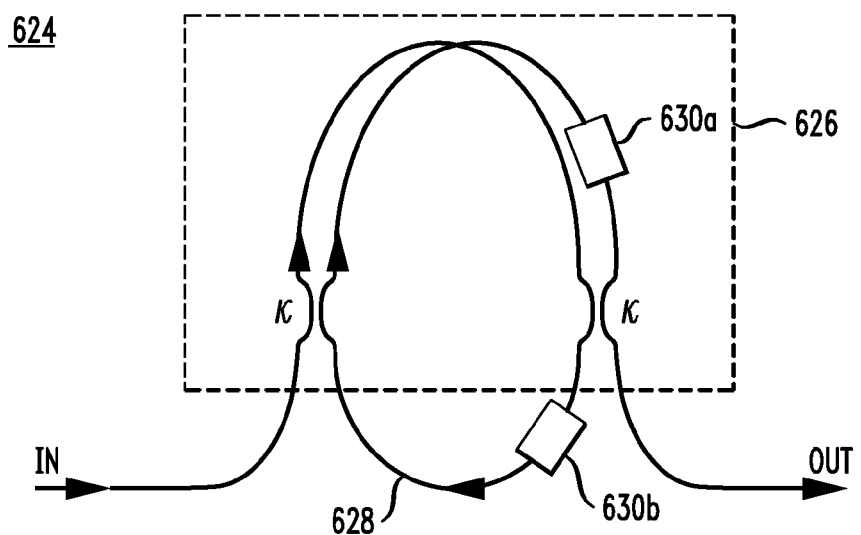

FIGS. 6A-B show an optical tunable delay circuit 608 that can be used as each instance of optical tunable delay 408 of FIG. 4 according to another embodiment of the invention. Circuit 608 is generally analogous to circuit 508, and analogous elements of the two circuits are designated with labels having the same last two or three digits/letters. However, circuit 608 is specifically designed as an integrated waveguide circuit, whereas circuit 508 is generic and not limited to any particular implementation technology. Circuit 608 can be viewed as one possible implementation of circuit 508.

Referring to FIG. 6A, each of fixed delay elements 622a-d has a bi-spiral waveguide loop. The first spiral of the loop spirals inward until it connects with the second spiral, which then spirals outward. The length of the waveguide loop and therefore the signal-propagation delay time accrued therein is determined by the number of spiral turns. Therefore, delay element 622a has fewer spiral turns than delay element 622b, which has fewer spiral turns than delay element 622c, etc. The bi-spiral layout of delay elements 622a-d is advantageous in that it efficiently packs into a relatively small area a substantial length of waveguide, which helps to reduce the surface area occupied by circuit 608.

Each of tunable delay elements 618a-b is a tunable four-stage optical all-pass filter (OAPF). All-pass filters are known in the electrical and optical arts and have an advantageous property of affecting only the phase of a signal, rather than its amplitude. As explained in the above-cited U.S. Pat. No. 6,956,991, this OAPF property can be used to create a continuously tunable optical delay element that is relatively compact and does not have any mechanically movable parts. A tunable delay element based on an OAPF can contain one, two, or more OAPF stages. Various suitable single-stage and multi-stage OAPFs are disclosed, e.g., in commonly owned U.S. Pat. Nos. 6,289,151 and 7,016,615, both of which are incorporated herein by reference.

FIG. 6B shows an OAPF 624 that is used as a stage in OAPF 618. OAPF 624 has a Mach-Zehnder interferometer (MZI) 626 and a feedback path 628. The internal arms of MZI 626 are coupled to one another via two tunable optical couplers, each illustratively shown as having optical coupling strength κ. One of the MZI arms incorporates a tunable phase shifter 630a, and feedback path 628 incorporates a tunable phase shifter 630b. In the frequency domain, the group delay generated by OAPF 624 is represented by a periodic sequence of resonance-like peaks, with the shape and amplitude of the peaks and their periodicity (also referred to as the free spectral range (FSR) of the OAPF) determined by the lengths of the feedback loop and MZI arms, the coupling strengths, and phase shifts $\phi_a$ and $\phi_b$ introduced by phase shifters 630a-b, respectively. Using appropriate control signals, e.g., applied to tunable phase shifters 630a-b and/or the tunable optical couplers (K), one can change the shapes of the group delay curves generated by individual OAPFs 624 to produce a desired group delay curve for OAPF 618. Representative examples of group delay curves generated by OAPF 624 are disclosed, e.g., in the above-cited U.S. Pat. No. 6,289,151. Other OAPFs suitable for use as individual stages in other embodiments of OAPF 618 are also disclosed therein.

Figure 7:
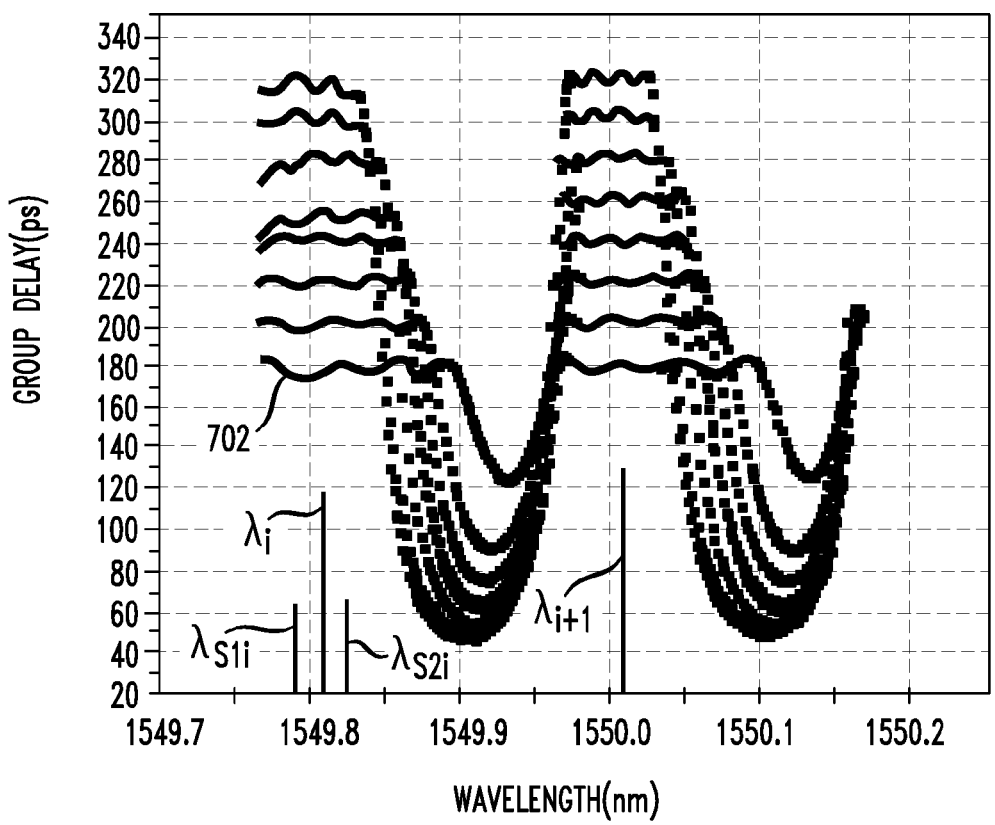
FIG. 7 graphically illustrates the group delay generated by an optical all-pass filter used in the optical tunable delay circuit of FIG. 6.

FIG. 7 graphically illustrates the group delay generated by OAPF 618. As already mentioned above, the group delay generated by an OAPF is periodic in the frequency domain. FIG. 7 shows two such periods for OAPF 618. One skilled in the art will appreciate that each of the group delay curves shown in FIG. 7 has additional periods extending out in wavelength (frequency) at both sides of the shown curve.

Each of the group delay curves shown in FIG. 7 corresponds to a particular configuration of OAPF 618. For example, a curve 702 corresponds to a configuration, in which four OAPFs 624 of OAPF 618 are configured, e.g., by selecting the MZI coupling strengths and the phase shifts, to stagger their respective resonance-like peaks so that the resulting cumulative group delay curve has a periodic sequence of relatively flat portions, each having a delay value of about 180 ps. The four ripples within each "flat" portion is a manifestation of the four staggered peaks, each representing a different one of OAPFs 624. One skilled in the art will appreciate that the amplitude of the ripples and/or the spectral width of the "flat" portion can be controlled, e.g., by changing the number of stages in OAPF 618. Other (unlabeled) group delay curves shown in FIG. 7 are analogous to curve 702 and are produced by tuning OAPFs 624, primarily by changing their respective MZI coupling strengths, to change the delay value corresponding to the "flat" portions. Generally, the spectral width of a "flat" portion decreases as the delay value corresponding to the "flat" portion increases.

In one embodiment, OAPF 618 is designed and configured so that the periodicity of its group delay curve (or its FSR) matches the spectral separation between the carrier wavelengths (frequencies) of WDM signal 116. As used herein the term "matches" means that the difference $\Delta f$ (expressed in Hz) between the spectral separation and the FSR is sufficiently small so that the cumulative frequency mismatch $N\Delta f$ across the wavelength multiplex ($\lambda_1$-$\lambda_N$) of WDM signal 116 does not exceed the spectral width of one "flat" portion. Although, in the above description, the term "flat portion" was explained in reference to a multi-stage OAPF, this term is similarly applicable to a single stage OAPF. More specifically, a spectral region near the maximum of a resonance-like group-delay peak of a single-stage OAPF, e.g., the spectral region encompassing delay values that do not deviate from the maximum delay value by more than 5%, can be considered as such "flat portion."

Furthermore, the "flat" portions of the group delay curves are spectrally aligned with the carrier wavelengths, e.g., as shown in FIG. 7. More specifically, FIG. 7 shows carrier wavelengths $\lambda_i$ and $\lambda_{i+1}$ of wavelength multiplex $\lambda_1$-$\lambda_N$. Note that the "flat" portions of the various group delay curves are aligned with carrier wavelengths $\lambda_i$ and $\lambda_{i+1}$ so that the respective modulation sidebands (see, e.g., modulation sidebands $\lambda_{s1i}$ and $\lambda_{s2i}$ of carrier wavelength $\lambda_i$) can substantially fit within the "flat" portions of the group delay curves for a desired range of delay values, e.g., those between about 180 and 320 ps. All these properties of OAPF 618 enable optical tunable delay circuit 608 to controllably delay all WDM components of WDM signal 116 by substantially the same delay time without demultiplexing that WDM signal. Using a plurality of tunable delay circuits 608, multiplex synchronizer 400 (FIG. 4) can advantageously be implemented as a waveguide circuit that has a relatively small size, does not have movable parts, has relatively low power consumption, and is able to efficiently maintain synchronization of a relatively large number of independent WDM signals.

Figure 8:
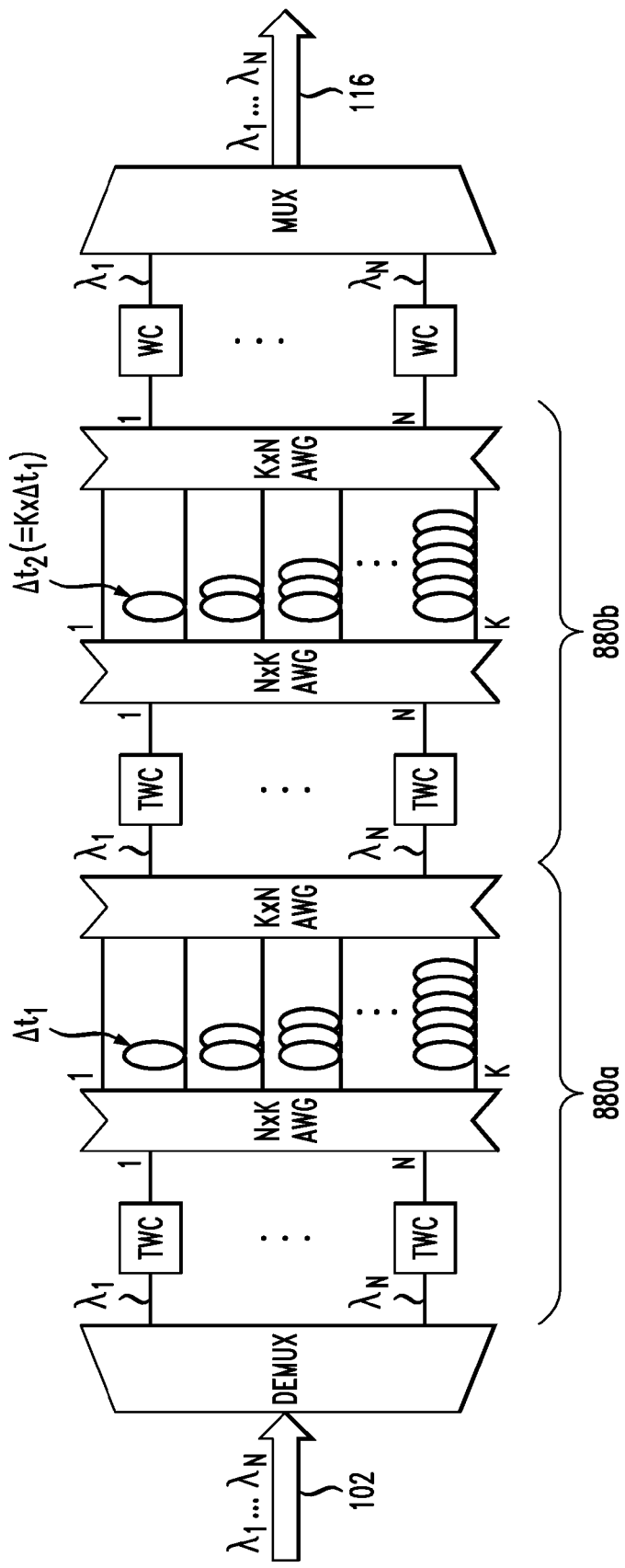
FIG. 8 shows a block diagram of a channel synchronizer that can be used in the system of FIG. 1 according to yet another embodiment of the invention.

FIG. 8 shows a block diagram of a channel synchronizer 800 that can be used as each instance of channel synchronizer 112 in FIG. 1 according to yet another embodiment of the invention. Channel synchronizer 800 is generally analogous to channel synchronizer 300 (FIG. 3). However, one difference between synchronizers 300 and 800 is that the latter has two cascaded delay stages 880a and 880b. Each stage 880 is similar to the delay stage used in synchronizer 300, which delay stage has TWCs $220_1$-$220_N$, two N×K AWGs 360a-b, and delay lines $234_1$-$234_K$ coupled between those AWGs. In one embodiment, the granularity ($\Delta t_2$) of delay stage 880b is K times larger than the granularity ($\Delta t_1$) of delay stage 880a. The relative delay range supported by this embodiment is from 0 to (K+1)$\Delta t_1$, with the delays in this range being tunable with a minimum increment of $\Delta t_1$. In one embodiment, channel synchronizer 800 can incorporate three or more cascaded delay stages 880 to further increase the accessible delay range without increasing the minimum delay increment.

In one embodiment, granularity $\Delta t_1$ and the number K are selected so that all possible inter-channel delays in input WDM signal 102 fall between zero and K$\Delta t_1$. As a result, delay stage 880a alone is capable of synchronizing different WDM components of input WDM signal 102 to each other. Delay stage 880b can then be used to further delay each of the WDM components by the same delay time by routing each of the WDM components through the same delay line of that delay stage. When multiple instances of channel synchronizer 800 are used to implement channel synchronizers 112 in system 100, the delay times imparted by delay stages 880b in different channel synchronizers 800 can be chosen so that different WDM signals 116 are synchronized to each other and optionally to reference clock signal 132. If such synchronization is performed, then multiplex synchronizer 120 becomes redundant and can be removed from synchronizer 110.

Figure 9:
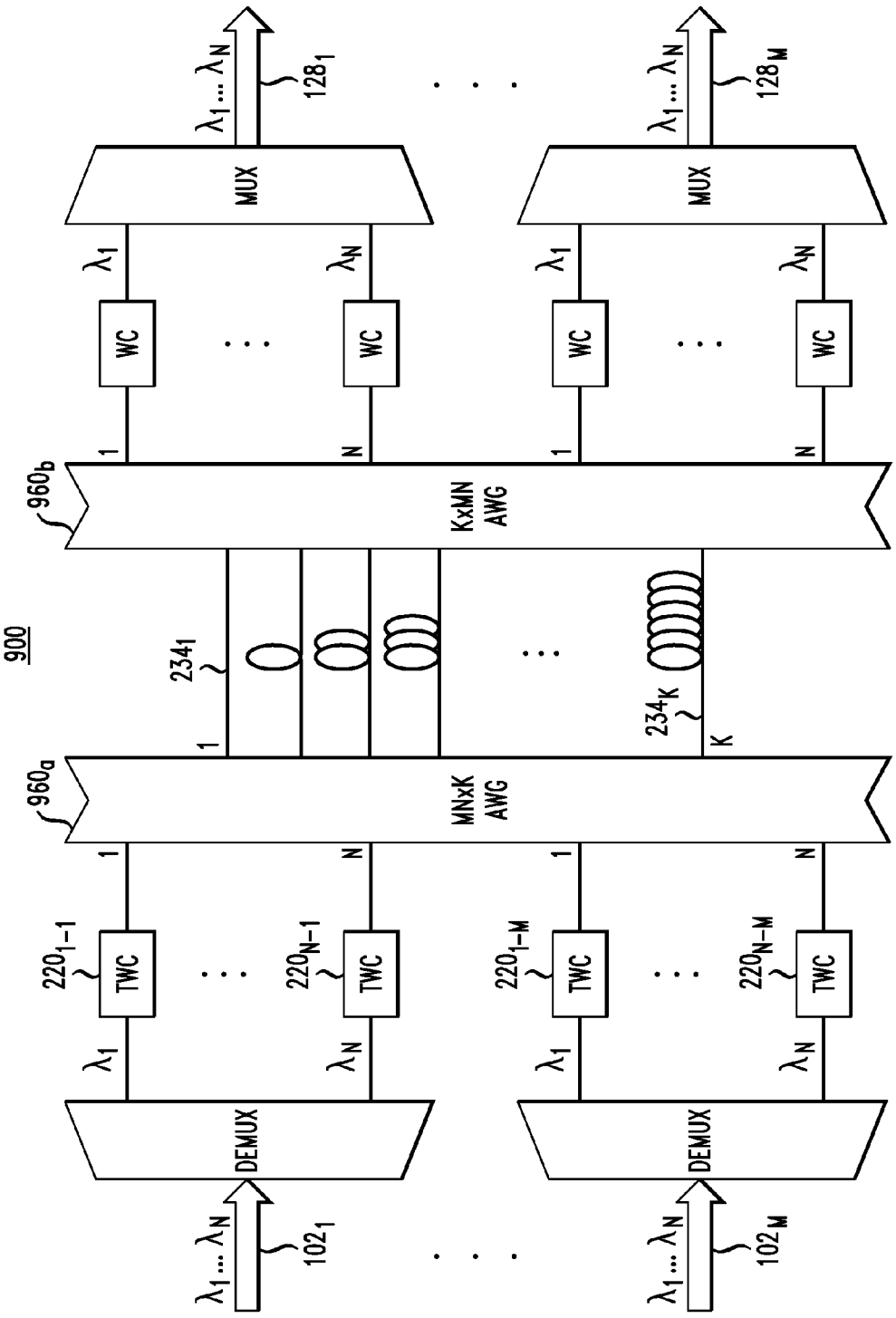
FIG. 9 shows a block diagram of an optical signal synchronizer that can be used in the system of FIG. 1 according to one embodiment of the invention.

FIG. 9 shows a block diagram of an optical signal synchronizer 900 that can be used as optical signal synchronizer 110 according to one embodiment of the invention. Optical signal synchronizer 900 is generally analogous to a plurality of channel synchronizers 300, which are implemented to share delay lines $234_1$-$234_K$. To enable this sharing, optical signal synchronizer 900 has two (M×N)×K AWGs 960a-b, each of which has (i) a first side having M×N ports and (ii) a second side having K ports. Delay lines $234_1$-$234_K$ are coupled between the second sides of AWGs 960a-b. TWCs 220 in optical signal synchronizer 900 may have to be able to generate more carrier wavelengths than TWCs 220 in channel synchronizer 300 to accommodate the increased number of channels in AWGs 960a-b compared to AWGs 360a-b. In a preferred embodiment, the delay range provided by delay lines $234_1$-$234_K$ in synchronizer 900 is sufficiently large to have synchronized (1) different WDM components of each individual WDM signal $128_1$ to each other and (2) different WDM signals 128 to each other and optionally to reference clock signal 132. Advantageously, the delay line sharing in optical signal synchronizer 900 enables the synchronizer to be implemented in a circuit having a relatively small surface area.

While this invention has been described with reference to illustrative embodiments, this description is not intended to be construed in a limiting sense. Various embodiments of the invention can be implemented as a single integrated circuit, a multi-chip module, a single card, or a multi-card circuit pack. For example, different types of synchronizers disclosed herein (e.g., fixed delay synchronizers 200 and 300 and continuous delay synchronizers based on OAPFs 608) can be optically integrated into a single silicon-based substrate or other semiconductor based substrates (e.g., from the InP-based compound family). Although certain embodiments of the invention have been described in reference to AWGs, other optical switch fabrics (OSFs) or wavelength-selective devices (e.g., based on echelle gratings or other diffractive elements) can be used to provide the same functionality. These alternative devices can similarly be optically integrated using a common substrate. An AWG, an OSF or a wavelength-selective device suitable for use in a channel synchronizer analogous to channel synchronizer 300 is herein referred to by a common term "wavelength-sensitive multi-port interconnect," or the corresponding acronym "WSMPI." While different signal synchronizers $112_1$-$112_M$ have been described as working independently (see FIG. 1), in a different embodiment, they can be concertedly controlled by a delay controller in an arrangement similar to that shown in FIG. 4 to produce both signal synchronization and multiplex synchronization. In that case, multiplex synchronizer 120 becomes redundant and can be removed from system 100. The principle of hardware sharing illustrated in FIG. 9 can also be applied to other embodiments of the invention. As known in the art, OAPFs have a finite spectral range of operation. As such, the term "all-pass" (which is a term of art) should not be construed as implying an unlimited spectral range. The "all-pass" functionality of the OAPFs should be construed as applicable to the OAPF's intended finite spectral range of operation. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An optical signal synchronizer, comprising:
   a plurality of optical channel synchronizers, each adapted to process a respective input wavelength division multiplexing (WDM) signal to produce a respective output WDM signal, in which optical data packets corresponding to different carrier wavelengths are synchronized to each other regardless of the presence or absence of such synchronization in the input WDM signal; and
   a delay controller adapted to control relative optical delays introduced by different optical channel synchronizers to synchronize said respective output WDM signals to each other regardless of the presence or absence of such synchronization in the input WDM signals, wherein at least one optical channel synchronizer comprises:
   a first demultiplexer (DEMUX) adapted to demultiplex the input WDM signal into a plurality of individual WDM components and direct said components along one or more tunable delay paths;
   a first multiplexer (MUX) adapted to receive the individual WDM components from the tunable delay paths and multiplex said received WDM components to produce said output WDM signal;
   a plurality of tunable wavelength converters, each adapted to independently convert a carrier wavelength of a respective individual WDM component into a selected one of K wavelengths, where K is a positive integer greater than one;
   a first wavelength-sensitive multi-port interconnect (WSMPI) having its input ports optically coupled to said plurality of tunable wavelength converters and adapted to direct an optical signal received at an input port of said first WSMPI to one of its output ports based on the wavelength of said received optical signal;
   an array of fixed delay lines, each optically coupled between a respective output port of the first WSMPI and a respective input port of a second WSMPI;
   said second WSMPI adapted to direct an optical signal received at an input port of said second WSMPI to one of its output ports based on the wavelength of said received optical signal; and
   a plurality of fixed wavelength converters, each adapted to convert any of said K wavelengths back into the carrier wavelength of the individual WDM component originally received by a corresponding tunable wavelength converter.

2. The invention of claim 1, wherein each of the first and second WSMPIs is an arrayed waveguide grating (AWG).

3. An optical signal synchronizer, comprising:
a first demultiplexer (DEMUX) adapted to demultiplex an input WDM signal into a plurality of individual WDM components and direct said components along one or more tunable delay paths;
a first multiplexer (MUX) adapted to receive the individual WDM components from the tunable delay paths and multiplex said received WDM components to produce an output WDM signal, in which optical data packets corresponding to different carrier wavelengths are synchronized to each other regardless of the presence or absence of such synchronization in the input WDM signal: and
a first optical all-pass filter (OAPF) adapted to apply a tunable group delay to the output WDM signal, wherein a free spectral range (FSR) of the first OAPF matches spectral separation between carrier wavelengths of the output WDM signal.

4. The invention of claim 3, wherein:
the first MUX and the first DEMUX are part of a channel synchronizer; and
the optical signal synchronizer comprises one or more additional instances of the channel synchronizer, each adapted to receive a different input WDM signal and produce a corresponding output WDM signal.

5. The invention of claim 4, further comprising:
an optical multiplex synchronizer adapted to receive the output WDM signals from the plurality of optical channel synchronizers and synchronize said output WDM signals to each other regardless of the presence or absence of such synchronization in the received WDM signals, wherein the optical multiplex synchronizer includes the first OAPF.

6. The invention of claim 5, wherein the optical multiplex synchronizer is further adapted to synchronize the WDM signals to a reference clock.

7. The invention of claim 6, further comprising a synchronous optical router controlled by the reference clock, wherein the synchronized WDM signals are applied to respective input ports of the router.

8. The invention of claim 5, wherein the optical multiplex synchronizer comprises:
a plurality of optical all-pass filters (OAPFs), each adapted to apply respective tunable group delay to a respective output WDM signal received from a respective one of the optical channel synchronizers, wherein a free spectral range (FSR) of the OAPF matches spectral separation between carrier wavelengths of the respective output WDM signal; and
a delay controller adapted to control the group delays of the OAPFs.

9. The invention of claim 8, wherein the group delays are continuously tunable.

10. The invention of claim 8, wherein:
at least one OAPF comprises two or more OAPF stages; and
said two or more OAPF stages are configured to produce a combined group delay curve having a periodic sequence of flat portions, each of said flat portions characterized by group delay variation not exceeding 5% and having a spectral width that is larger than a spectral width of the corresponding flat portion in a group delay curve individually produced by any one of said two or more OAPF stages.

11. The invention of claim 10, wherein the at least one OAPF further comprises:
one or more of fixed delay elements; and
one or more switches adapted to controllably engage or disengage said fixed delay elements, wherein the WDM signal traverses each of the engaged fixed delay elements and bypasses each of the disengaged fixed delay elements.

12. The invention of claim 8, wherein, for each OAPF of said plurality, flat portions of the OAPF's group delay curve are spectrally aligned with the carrier wavelengths to enable modulation sidebands of a carrier wavelength to substantially fit within a spectral range corresponding to a respective flat portion.

13. The invention of claim 3, wherein the optical signal synchronizer is an integrated waveguide circuit.

14. An optical signal synchronizer, comprising:
a plurality of optical channel synchronizers, each adapted to process a respective input wavelength division multiplexing (WDM) signal to produce a respective output WDM signal, in which optical data packets corresponding to different carrier wavelengths are synchronized to each other regardless of the presence or absence of such synchronization in the input WDM signal; and
a delay controller adapted to control relative optical delays introduced by different optical channel synchronizers to synchronize said respective output WDM signals to each other regardless of the presence or absence of such synchronization in the input WDM signals, wherein at least one optical channel synchronizer comprises:
a first demultiplexer (DEMUX) adapted to demultiplex the input WDM signal into a plurality of individual WDM components and direct said components along one or more tunable delay paths; and
a first multiplexer (MUX) adapted to receive the individual WDM components from the tunable delay paths and multiplex said received WDM components to produce said output WDM signal, wherein at least one of said tunable delay paths comprises:
a tunable wavelength converter adapted to convert a carrier wavelength of a respective individual WDM component into a selected one of K wavelengths, where K is a positive integer greater than one;
a second DEMUX optically coupled to the tunable wavelength converter, said second DEMUX adapted to apply each of said K wavelengths to a different respective fixed delay line;
a second MUX optically coupled to the fixed delay lines and adapted to direct optical signals received therefrom to a fixed wavelength converter; and
said fixed wavelength converter adapted to convert any of said K wavelengths back into the carrier wavelength of the individual WDM component originally received by the tunable wavelength converter.

15. An optical signal synchronizer, comprising:
a first demultiplexer (DEMUX) adapted to demultiplex an input WDM signal into a plurality of individual WDM components and direct said components along one or more tunable delay paths;
a first multiplexer (MUX) adapted to receive the individual WDM components from the tunable delay paths and multiplex said received WDM components to produce an output WDM signal, in which optical data packets corresponding to different carrier wavelengths are synchronized to each other regardless of the presence or absence of such synchronization in the input WDM signal;
a plurality of tunable wavelength converters, each adapted to convert a carrier wavelength of a respective individual WDM component into a selected one of K wavelengths, where K is a positive integer greater than one;

a first wavelength-sensitive multi-port interconnect (WSMPI) having its input ports optically coupled to said plurality of tunable wavelength converters and adapted to direct an optical signal received at an input port of said first WSMPI to one of its output ports based on the wavelength of said received optical signal;

an array of fixed delay lines, each optically coupled between a respective output port of the first WSMPI and a respective input port of a second WSMPI;

said second WSMPI adapted to direct an optical signal received at an input port of said second WSMPI to one of its output ports based on the wavelength of said received optical signal; and a plurality of fixed wavelength converters, each adapted to convert any of said K wavelengths back into the carrier wavelength of the individual WDM component originally received by a corresponding tunable wavelength converter.

16. The invention of claim 15, wherein each of the first and second WSMPIs is an arrayed waveguide grating (AWG).

17. The invention of claim 15, wherein:

the optical channel synchronizer comprises one or more additional instances of the first MUX and the first DEMUX, each coupled to a corresponding plurality of tunable or fixed wavelength converters; and the first WSMPI, the array of fixed delay lines, the second WSMPI are shared to produce relative delays for optical signals produced by different pluralities of tunable wavelength converters and to provide input signals for different pluralities of fixed wavelength converters.

18. An optical signal synchronizer, comprising:

a first optical channel synchronizer adapted to process a first input wavelength-division-multiplexing (WDM) signal to produce a first output WDM signal, in which optical data packets corresponding to different carrier wavelengths of said first output WDM signal are synchronized to each other regardless of the presence or absence of such synchronization in the first input WDM signal;

a second optical channel synchronizer adapted to process a second input WDM signal to produce a second output WDM signal, in which optical data packets corresponding to different carrier wavelengths of said second output WDM signal are synchronized to each other regardless of the presence or absence of such synchronization in the second input WDM signal; and a delay controller adapted to control relative optical delays introduced by the first optical channel synchronizer and the second optical channel synchronizer to synchronize the first output WDM signal and the second output WDM signal to each other regardless of the presence or absence of such synchronization between the first input WDM signal and the second input WDM signal, wherein:

each of the first input WDM signal and the first output WDM signal has a first plurality of WDM components; and each of the second input WDM signal and the second output WDM signal has a second plurality of WDM components different from the first plurality of WDM components.

* * * * *